US008687641B2

(12) United States Patent
Westin et al.

(10) Patent No.: US 8,687,641 B2
(45) Date of Patent: *Apr. 1, 2014

(54) SYSTEMS AND METHODS FOR CONVERTING AND DELIVERING NONDESTRUCTIVE EVALUATION IMAGES TO MOBILE DEVICES AND REMOTE COMMUNICATIONS SYSTEMS

(75) Inventors: Martin Westin, Stockholm (SE); Johanna Wollert Melin, Stockholm (SE); Åsa Sjöblom Nordgren, San Diego, CA (US)

(73) Assignee: Trice Imaging, Inc., Del Mar, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 12/954,359

(22) Filed: Nov. 24, 2010

(65) Prior Publication Data

US 2011/0128966 A1 Jun. 2, 2011

Related U.S. Application Data

(60) Provisional application No. 61/264,742, filed on Nov. 27, 2009.

(51) Int. Cl.
*H04L 12/56* (2011.01)
*G06F 17/30* (2006.01)

(52) U.S. Cl.
USPC ............... 370/401; 707/792; 707/803

(58) Field of Classification Search
None
See application file for complete search history.

(56) References Cited

U.S. PATENT DOCUMENTS

| 2002/0016718 | A1* | 2/2002 | Rothschild et al. ......... 705/2 |
| 2002/0091659 | A1 | 7/2002 | Beaulieu et al. |
| 2007/0099605 | A1* | 5/2007 | Shanahan ............... 455/418 |
| 2007/0299853 | A1* | 12/2007 | Knotz et al. ............. 707/10 |
| 2008/0021730 | A1* | 1/2008 | Holla et al. ............. 705/2 |
| 2008/0109250 | A1* | 5/2008 | Walker et al. ............ 705/2 |
| 2009/0164253 | A1 | 6/2009 | Lyshkow |
| 2009/0164504 | A1* | 6/2009 | Flake et al. ............. 707/102 |

FOREIGN PATENT DOCUMENTS

| KR | 1020070022975 A | 2/2007 |
| KR | 1020090053039 A | 5/2009 |

OTHER PUBLICATIONS

International Search Report and Written Opinion issued in International Patent Application Na PCT/US2010/052746 on May 30, 2011 (10 pages).

* cited by examiner

*Primary Examiner* — Hassan Kizou
*Assistant Examiner* — Tejis Daya
(74) *Attorney, Agent, or Firm* — Procopio, Cory, Hargreaves & Savitch LLP; Noel C. Gillespie

(57) ABSTRACT

A method for automated conversion and delivery of nondestructive evaluation (NDE) images, comprising: storing a plurality of NDE images, metadata associated with the plurality of NDE images, converted NDE images, a plurality of standardized format specifications for a plurality of destination devices and services, and a plurality of message templates; receiving a NDE image file via a communications interface; determining whether the NDE data includes NDE image data; determining an output destination type; correlating the output destination type with one or more of the plurality of standardized format specifications and with one or more of the plurality of message templates; converting the NDE data format associated with the NDE data based on the standardized format specifications that correlate with the output destination type; and assembling at least one output message that includes the converted NDE data based on the message templates that correlate with the output destination type.

40 Claims, 8 Drawing Sheets

SYSTEMS AND METHODS FOR CONVERTING AND DELIVERING NONDESTRUCTIVE EVALUATION IMAGES TO MOBILE DEVICES AND REMOTE COMMUNICATIONS SYSTEMS

RELATED APPLICATIONS INFORMATION

This application claims priority under 35 U.S.C. 119(e) to U.S. Provisional Patent Application Ser. No. 61/264,742, filed Nov. 27, 2009, and entitled "Converting and Delivering Digital Imaging and Communications in NonDestructive Evaluation (DICONDE) Image Files to Mobile Devices and Remote Communication Systems," which is incorporated herein by reference in its entirety as if set forth in full.

BACKGROUND

1. Technical Field

The embodiments described herein are related to delivery of nondestructive evaluation image files, and more particularly to the automatic conversion of nondestructive evaluation image files for delivery to mobile devices and/or remote communication systems.

2. Related Art

Inspection devices and imaging systems within the field of nondestructive testing have become increasingly complex in recent years. In response to the increasing challenges in digital imaging technology, the American Society for Testing and Materials started developing the Digital Imaging and Communications in NonDestructive Evaluation (DICONDE) standard based on the DICOM standard developed by the American College of Radiology (ACR) and the National Electrical Manufacturers Association (NEMA). DICONDE is a standard for handling, storing, printing, and transmitting information in Nondestructive testing/Nondestructive evaluation ("NDT/NDE", hereinafter referred collectively to as "NDE") imaging. It includes a file format definition and a network communication protocol. The network communication protocol is an application protocol that uses TCP/IP to communicate between systems. One of the goals of the standard is to make uniform the transferring of NDE images and information between viewing and scanning sources to allow users of different imaging software and/or hardware to share information. DICONDE files can be exchanged between two entities that are capable of receiving image and NDE data in DICONDE format. DICONDE enables the integration of inspection devices, servers, workstations, printers, and network hardware from multiple manufacturers into a Picture Archiving and Communication System (PACS) for storing and downloading of digital images. The different devices come with DICONDE conformance statements which clearly state the DICONDE classes they support. DICONDE is quickly gaining popularity among both equipment manufacturers and testing companies.

DICONDE files commonly contain images or image-type data; therefore, they will often be referred to as DICONDE images. DICONDE files may contain media data, such as, video and audio data, or no media data at all. In that case, DICONDE files may contain other test-data or only metadata identifying the originating modality, the operator, or the component being examined. Modality refers to any image generating equipment in NDE imaging, such as, Ultrasound (US), InfraRed Thermography (IR), radiographs, Computed Tomography (CT), Eddy Current, Acoustic Emission and the like.

The type of data and amount of data available in any one DICONDE file varies. A DICONDE file is generally structured using data identifying Component, Study, Series and Instance in that hierarchical order. A Component can be involved in a number of Studies (cases), which in turn may contain a number of Series (examination or inspections), which in turn may contain a number of Instances (files usually containing images). It means that a DICONDE file can be unambiguously identified and fitted into that hierarchy. All DICONDE files contain an identifier for the generating modality. In other words, the identifier will reflect the equipment or location in which the file was originated. The files also contain timestamps pertaining to both the file itself (Instance) and the Series. Using the timestamps and the originating identifier, an image can be unambiguously identified using that data without Component information. In addition, DICONDE file format differs from most other data formats in that it groups information into data sets. For example, a file of an ultrasound inspection actually contains the component ID within the file, so that the image can never be separated from this information by mistake.

Most PACS handle images from various imaging instruments, including US, IR, CT, and the like. Electronic images and reports are transmitted digitally via PACS; this eliminates the need to manually file, retrieve or transport film jackets. A PACS consists of four major components: the imaging modalities; a secured network for the transmission of information; workstations for interpreting and reviewing images; and long and short term archives for the storage and retrieval of images and reports. Combined with available and emerging Web technology, PACS has the ability to deliver timely and efficient access to images, interpretations and related data. PACS breaks down the physical and time barriers associated with traditional film-based image retrieval, distribution and display.

Images and data from NDE imaging equipment has until recently operated largely in the analog domain. A number of limiting features of these systems are problematic in terms of archiving, remote viewing and comparisons with previous tests. Modern imaging equipment outputs digital data making such things more manageable. The remaining problem of interoperability and data communication is being addressed via an initiative based on the medical standard DICOM, currently called DICONDE, for both image file format and network transfers. Since many of the modalities used in NDE imaging are also found in medical imaging, the DICOM standard is ideally suited as a base for a data format and communication protocol in the NDE field.

DICONDE images are generally not readable by consumer image viewers or mobile devices. Therefore, persons and companies wanting to share images struggle with conversion and delivery of these images. A good example is to request a second opinion on ambiguous images from an Ultrasound inspection of a component. The on-site technician finds a flaw but can not determine if the flaw is a defect or within acceptable parameters. He/she would ideally like a second opinion on his/her results while still being on-site and conducting the inspection. This would require the technician to perform a number of separate actions in an effort to transfer the relevant data and contact an expert colleague for a second opinion. Thus, there exists a need for a system and method to enable technicians to share images and communicate information with their colleagues and clients, efficiently, and timely.

A need also exists for a system and method to enable smaller inspection companies to convert, deliver and receive NDE images economically and timely. These facilities usually do not have the technical support-staff or finances to run a full PACS for image archiving and delivery to remote experts for second opinions and consultations. They often resort to using films, or writable CDs which are sent by mail or messenger. This is both slow, environmentally unfriendly and, in the case of using unregistered postal delivery, insecure. The cost of running a PACS is not just paying the licensing fees. Major investments in advanced infrastructure including the surrounding software, hardware, and facility, as well as the cost for educating staff, and the hours spent on administration will add to the cost of running a PACS. These major investments are expensive, therefore, usually out-of-reach for most small businesses.

SUMMARY

Systems and methods for the quick and easy distribution of nondestructive evaluation images to a plurality of output modalities in a manner that maintains the highest possible image quality and resolution are described herein.

According to one aspect, a method for automated conversion and delivery of nondestructive evaluation (NDE) images, comprising: storing a plurality of NDE images, metadata associated with the plurality of NDE images, converted NDE images, a plurality of standardized format specifications for a plurality of destination devices and services, and a plurality of message templates; receiving a NDE image file via a communications interface, the NDE image file comprising NDE data and metadata, the NDE data having a NDE data format; determining whether the NDE data includes NDE image data; determining an output destination type, wherein the output destination type is an output device, service, or both, based on the metadata; correlating the output destination type with one or more of the plurality of standardized format specifications and with one or more of the plurality of message templates; converting the NDE data format associated with the NDE data based on the standardized format specifications that correlate with the output destination type; and assembling at least one output message that includes the converted NDE data based on the message templates that correlate with the output destination type; and transmitting the output message to at least one destination via the communication interface.

According to another aspect, a system for automated conversion and delivery of nondestructive evaluation (NDE) images, comprising: a communication interface; a data storage system configured to store a plurality of NDE images, metadata associated with the plurality of NDE images, converted NDE images, a plurality of standardized format specifications for a plurality of destination devices and services, and a plurality of message templates; a receiver configured to receive a NDE image file via the communications interface, the NDE image file comprising NDE data and metadata, the NDE data having a NDE data format that complies with the digital imaging and communication in nondestructive evaluation standard, a parser configured to determine whether the NDE data includes a NDE image data and to determine an output destination type, wherein the output destination type is an output device, service, or both, based on the metadata, a correlator configured to correlate the output destination type with one or more of the plurality of standardized format specifications and with one or more of the plurality of message templates, an image converter configured to convert the NDE data format associated with the NDE data based on the standardized format specifications that correlate with the output destination type, and assembler configured to assemble at least one output message that includes the converted NDE data based on the message templates that correlate with the output destination type, and an output module configured to transmit the output message to at least one destination via the communication interface.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
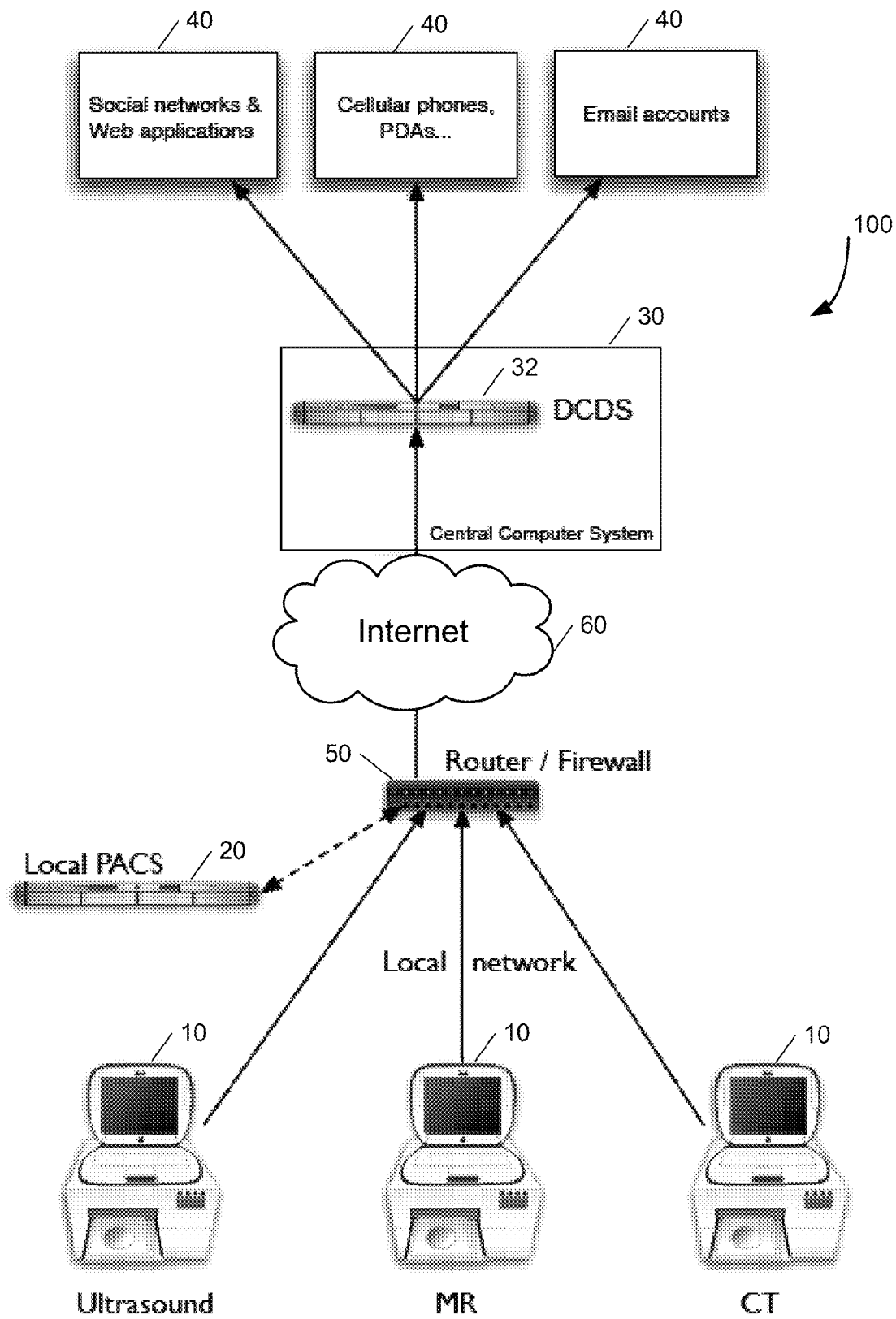
FIG. 1 is a diagram illustrating an example system for the automatic conversion and distribution of NDE images to any of a plurality of output modalities in accordance with one embodiment.

FIG. 1 is a diagram illustrating an example system 100 for the automatic conversion and distribution of nondestructive evaluation images to any of a plurality of output modalities. The term output modality is used to refer to various types of devices, systems, and services, several examples of which are provided below. As can be seen, system 100 can comprise a plurality of source medical imaging modalities 10, such as Ultrasound, MRI, CT and PET equipment, a local PACS 20 (typically source image archive-servers), or any other device capable of sending DICONDE data, commonly images. Modalities 10 and PACS 20 can be connected, e.g., with a Central Computer System (CCS) 30 via the Internet 60 through a router 50 usually provided with encryption and firewall protection.

Central Computer System (CCS) 30 can include a data conversion and delivery system (DCDS) 32 for processing the data. The CCS can comprise one or more servers, and include one or more a processors or CPUs, memory associated with the processor(s), a data storage module, a display means, and an input/output interface means. It should be appreciated that various other peripheral devices and modules can be connected to the CCS 30, such as other servers, other data storage modules, or intrusion detection systems. The CCS 30 can also be a cluster of interoperating servers, each taking care of a specific task within the system. Similarly, all the modules shown in FIG. 2, and described below can each be a separate server in such a cluster, so as to distribute the load and increase the capacity of the system.

DCDS 32 can be configured to convert NDE images and associated metadata into, e.g., consumer-friendly images, video, or both. DCDS 32 can then in turn send these converted images to a number of destinations, or output modalities 40 as directed by the user/operator of DCDS 32 or as dictated by information included in the NDE data. These destinations 40 can be, for example, a web site such as a social networking site including, e.g., Twitter, Facebook, and Google Health; cellular phones; PDAs; Email accounts; or any computer system capable of accepting data via protocols such as, e.g., SOAP and REST. DCDS 32 functions in such a way that it allows source modalities (10, 20) to be protected by the most rigorous of firewall settings 50, while still allowing transfers to take place over the internet 60. The original source image data may optionally be sent to the destinations 40 without any processing or conversion.

For example, when a component undergoes an ultrasound examination to locate cracks in the component, a small and slightly ambiguous echo is captured during the examination. The ultrasound technician, sends the stored, e.g., DICONDE file to DCDS 32. The technician can use a remote graphical user interface (GUI) interfaced with DCDS 32 to bring up the desired sequence sent by the source modality 10. In some embodiments, the ultrasound technician writes a brief description of examination results and requests a second opinion. The technician can then enter the cellular phone numbers, web account information, email addresses, etc., and then start the delivery process. In some embodiments, the technician enters the cellular phone number and email address of an expert colleague. The, e.g., DICONDE file, now converted into a cellular phone compatible video format, e.g., 3 gpp, can then be sent as a multimedia message to the mobile phones, and files converted to other appropriate formats can also be sent to the given email and web accounts.

In some embodiments, the message could prompt the recipient, e.g., expert colleague, to access the GUI to gain full access to the data. In such embodiments, the expert colleague examines the captured images and determines if the flaw is a defect of within acceptable parameters and communicates his findings back to the on-site technician and into the report for the current inspection.

Alternatively, the technician can enter the expert colleague's cellular phone number in the metadata information field on the ultrasound machine. On receiving the, e.g., DICONDE data file, DCDS 32 can be configured to then locate that number embedded in the DICONDE data file, and automatically forward the converted image or video file after processing to the desired locations as specified by the technician. Examples of these processes are described in detail below.

Figure 2:
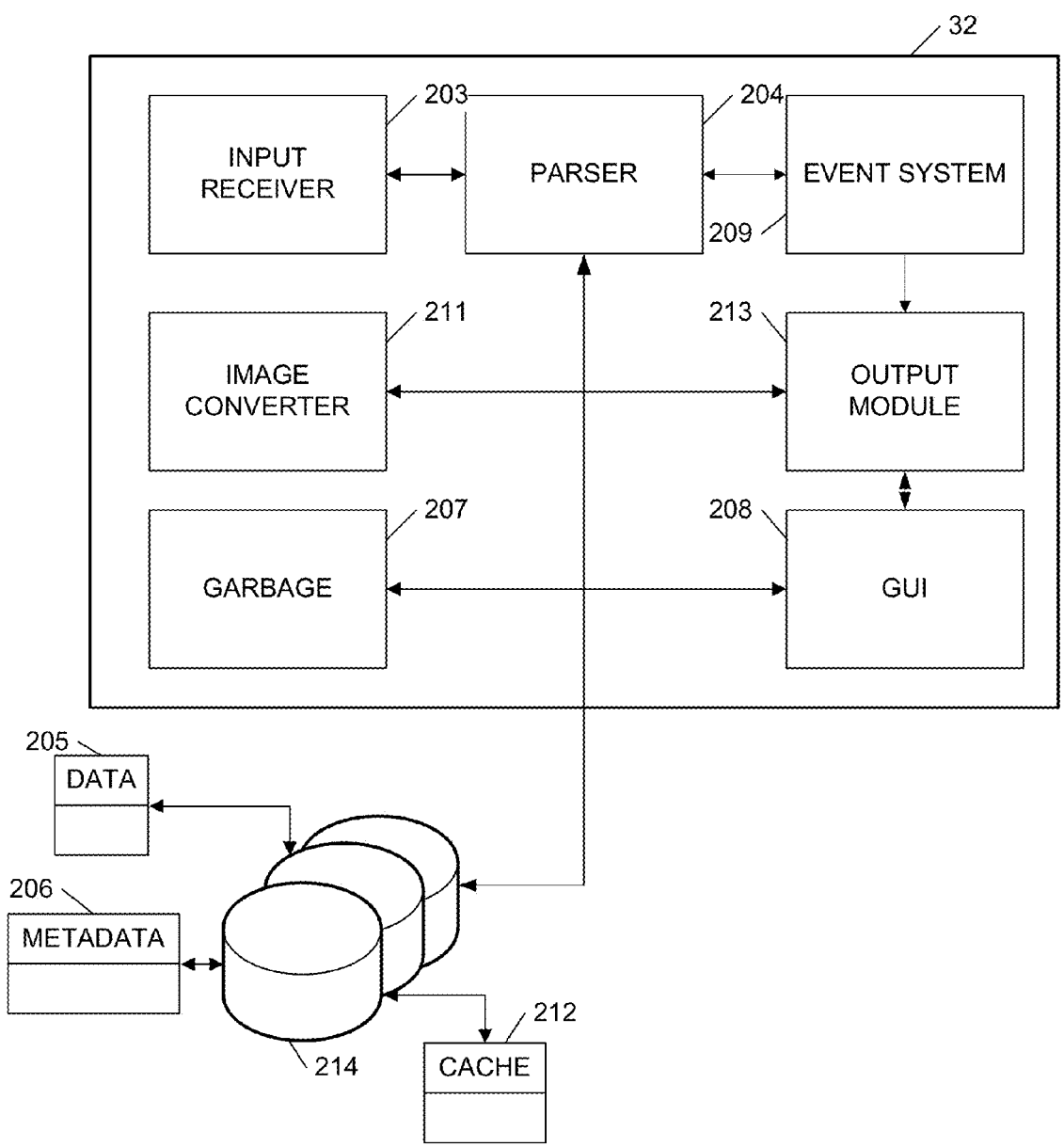
FIG. 2 is a high level block diagram illustrating certain components of an example data conversion and delivery system that can be included in the system of FIG. 1 in accordance with one embodiment.

FIG. 2 is a high level block diagram illustrating certain components of an example DCDS 32 in accordance with one embodiment. It will be understood that the diagram of FIG. 2 is for purposes of explanation and illustration and is not intended to restrict the embodiments described herein to any particular architecture or design. Nor is FIG. 2 intended to provide a detail view of all components of an example DCDS 32. In operation, a request from a modality 10 can be handled by an input stage, consisting of a Receiver 203 and Storage & Parser 204. The Receiver 203 can be configured to authenticate the connection from the source modality 10, and to handle the network transactions necessary to complete the request.

Storage & Parser 204 can be configured to parse the received data and to store any image data 205 and all metadata 206 in storage system 214. For example, the image data 205 can be stored as binary data, while the metadata can be stored as structured data allowing typical structured access to the data, such as, searches and associations between different items. Storage & Parser 204 can be configured in certain implementations or under certain conditions to strip all sensitive information from the incoming data file. For example, an operator of the system can use a Graphical User Interface (GUI), such as a Web GUI 208 to selectively set the parts of metadata that are considered to be sensitive. Alternatively, the system can be programmed to automatically determine which fields in the metadata are sensitive. This process is called anonymization and is discussed in more detail below.

In certain embodiments, an event signal can be triggered indicating that the newly stored data has been added. When Event System module 209 receives an event signal from the parser 204, it can be configured to determine what action, if any, should be taken as a result. For example, if rules for automatic delivery have been set, and the appropriate metadata values are found in the newly received data stored in structured database 206, then Event System module 209 can be configured to signal the Output Module 213 to send the converted data as instructed by the automatic delivery rules. This process is also described in more detail below.

Output Module 213 can be configured to accept calls from other parts of DCDS 32 containing general data, information to send, and number of delivery destinations, including email addresses. For example, the data can include a text message, a reference to a, e.g., DICONDE image, two cellular phone numbers, and one email address. The Output Module 213 can be configured to assemble the appropriate formatted output "packages", or messages, and send the resulting messages using a modular plug-in-based architecture. A plug-in (not shown) for each corresponding type of destination can be included and used by Output Module 213.

In the example provided above, when a service call is received by DCDS 32, Output Module 213 can assemble one MMS message packet containing a jpeg version of an image and message text, all combined and encoded according to the MMS specifications. This message can then be sent twice, first to each phone number destinations requested, and secondly, to each email address destinations specified.

Output Module 213 can request a converted image from Image Converter 211, identifying the original image and specifying the requested format and dimensions. Image Converter 211 can be configured to then look for an existing image in the Converted Image Cache 212 that matches the request. If no match is found, it can generate an image from the original image data 205. The Image Converter 211 can be configured to use the metadata 206 of the original image stored in database to determine if the requested format is appropriate. If not, it can respond with an error. For example, requesting an mp3 audio version of a still image would result in an error, while requesting a jpeg still image of a multi-frame DICONDE image file (effectively video) would be proper.

Image Converter 211 can be configured to respond to an event from Parser 204 and perform common conversions preemptively. This will improve the responsiveness of the system components, in particular, the Output Module 213 and the Web GUI 208; however, the trade-off is an increase in storage required, and also a slight decrease in the overall security level.

A Web GUI 208 provides, e.g., ultrasound technicians with remote access to DCDS 32 via a secured web browser connection (https) 202. Such a Web GUI 208 can provide an interface to perform administrative tasks such as setting up rules for Event System module 209, as well as an optimized interface for identifying images and sending output messages. The typical operations of these interfaces are described in detail below.

Web GUI 208 can operate on the structured metadata 206 to find and identify images. It can be configured to request conversions from Image Converter 211 to, e.g., display thumbnails and previews of images, and to provide service request forms where output messages can be specified and send on to Output Module 213 for delivery.

In some embodiments, Image Converter 211 can be configured to determine, e.g., based on information stored in storage system 214, the required resolution or image quality. For example, resolution, image quality, or both for various types of images, can be stored in storage system 214. Image converter can then determine the correct image resolution and quality and covert the image in accordance therewith. In certain embodiments, DCDS 32 can be configured to determine whether the identified output device or address is capable of displaying the converted image with the requisite image resolution and quality before sending the image. If the device or address is not capable, then DCDS 32 can generate an error message or other notification indicating such. The error message can be displayed through GUI 208, on the device, or both.

An adaptable Garbage Collector 207 can continually evaluate the state of all data and compare that to configurations made by an administrator of the system. The configuration can set certain criteria that items need to meet in order to remain in the system or be deleted from the system. One basic criterion can be the age of an item. For example, if an item has been stored over a week ago or certain number of days ago could be automatically deleted. Other automatic deletion criteria can be the number of times an item has been previously sent, system state information stored, and the value of any metadata. This feature is in part useful for keeping the resource usage down, and also to aid patient confidentiality by removing patent data that the system is no longer needed to maintain.

Figure 3:
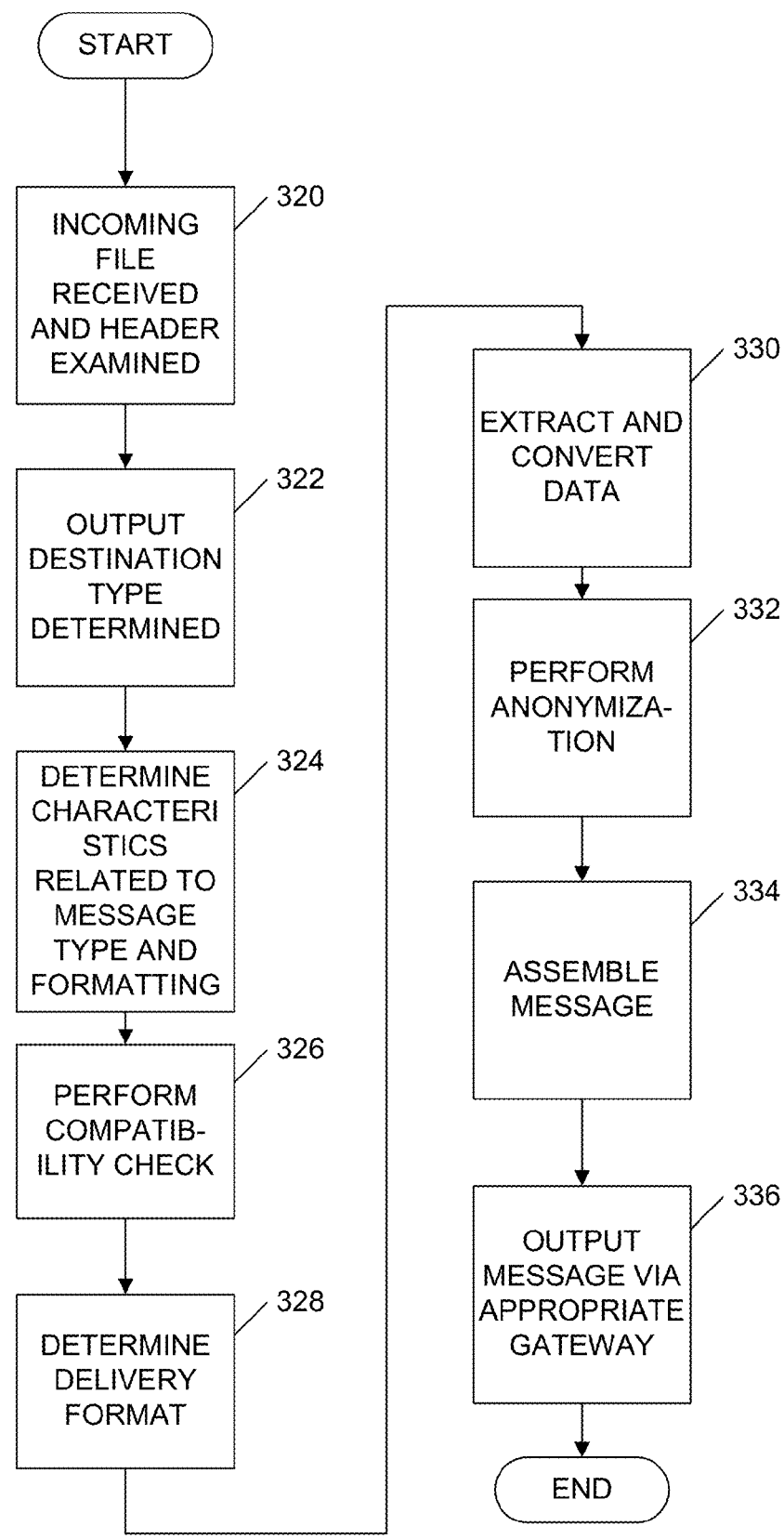
FIG. 3 is a flow chart illustrating an example automated message creation process performed by the data conversion and delivery system of FIG. 2 in accordance with one embodiment.

As noted above, DCDS 32 can be configured to take an incoming NDE image file and automatically convert it for distribution to and viewing by any of a plurality of output modalities. FIG. 3 is a flow chart illustrating one example embodiment for an automated message creation operation performed by DCDS 32 in accordance with one embodiment. In the example of FIG. 3, it is assumed that destination information, e.g., output modality information is included in a NDE image file received by DCDS 32. In other embodiments, a user can access DCDS 32, e.g., through GUI 208 and specify which files should be sent to which output modalities; however, a powerful aspect of DCDS 32, as configured in accordance with the systems and methods described herein, is its ability to automatically determine the destinations and to convert and format the data appropriately as described below.

In step 320, a file is received and the headers associated therewith are examined to determine various information. The NDE image file received by input 203 will often include metadata that provides information related to the NDE data or images included therewith. For example, in a DICONDE file, the NDE image file will include a header that comprises a plurality of fields. These fields are generally the same for each input modality 10. Thus, DCDS 32 can be configured to examine the header fields to determine various information as described in detail below and with respect to FIG. 4.

In step 322, an output destination type, or modality can be determined. For example, the header can include information identifying recipients of the images included in the image file. Or more specifically, the header can include information identifying output modalities associated with various recipients or services, e.g., such as an online site, or service; a social networking page or service, a mobile device, etc. Basic types of destinations can include a mobile device, such as a cellphone; an email account; a Web-Application Specific Interface (API), e.g., associated with an online site or service, etc. Thus, DCDS 32 can be configured to examine the header file and determine associated output devices or services, i.e., modalities.

Whenever possible, DCDS 32 can be configured to then retrieve specific characteristics of each destination type as indicated in step 324. These characteristics can include capabilities and physical characteristics of the destination device and specifications and limitations of the network class and message type. This information is then used to determine the output formatting and other specifications needed for each output modality. For example, this information can be used for adaptations of the image data based on specifications for the type of message being sent, e.g., e-mail has limitations in specification and common practice that can be adapted for; and MMS has very different limitations that can be adapt for.

The capabilities and characteristics determined in step 324 can include frame size, i.e., pixel dimensions of an image or video, e.g., 640 by 480 and the like; data rate or data size, e.g., MMS messages can commonly not exceed 300 KB total size, e-mail attachments exceeding 10 MB are often not accepted, etc.; supported encoding format, e.g. mpeg 4, jpeg, etc.; and message layout rules, i.e., how a message can be composed for the destination, e.g. MMS is made of "pages", each able to display a single image or video and a single text along with playing audio while e-mail is capable of HTML layouts and can hold attachments of any file type, etc.

In step 326, a basic compatibility check can be performed to determine whether the data included in the image file can be delivered in a format compatible with the output modality. For example, if the image data includes video data, then a determination can be made as to whether the output modality is capable of receiving and displaying video data.

The most suitable delivery format is then chosen in step 328 to ensure the output message that is ultimately generated includes the best quality data that the output modality can handle.

Then, in step 330 the data can be extracted and converted as required. For example, MMS messages allow only a very limited total message size. Therefore images or video in particular often need to be adapted and optimized to let the final message meet the format and specification requirements of a particular output modality. In contrast, e-mail messages often have no strict limit on size and therefore can accept larger files, e.g., higher resolution images or video. But even e-mail accounts can include rules limiting extremely large files and therefore even e-mail messages can require optimization of, e.g., video files to ensure sufficient quality but also to comply with size limitations.

If the incoming file is already encoded in a format compatible with the output modality, then often no conversion will occur in step 330 in order to preserve the highest possible image quality.

In step 332, the data can be anonymized as required by any applicable anonymization rules. For example, the data can be extracted and copied into a generic format so that certain data can be removed, redacted, etc. The data can then be converted to the final output format. Steps 330 and 332 can be performed in parallel or reverse order as required by a particular implementation.

In step 334, the converted data can then be assembled into an output message in accordance with the applicable formats and specifications determined in the preceding steps. Optionally, other data can be included with the message. This information can be manually entered, e.g., via GUI 208 or it can be extracted from the metadata accompanying the received file. Still further, the data can be data retrieved from configuration settings based on the set of characteristics described above.

In certain embodiments, the data components that are to comprise an output message are assembled according to template rules for the type of message being created. For example, the various template rules can be stored in Storage System 214 and accessed by Output Module 213 in order to assemble the output message. For example, MMS messages are based on a page metaphor where each page can contain an image or video, a text element, and an audio element. Thus, sending two or more images, or including text, audio, or both with the image(s) will then require the message to be assembled into several pages. By contrast, e-mail messages can include any number of images, attachments, etc., depending on, e.g., the message size restrictions.

Output Module 213 can then be configured to elect the appropriate output gateway for transmission of the assembled output message in step 336. For example, Output Module 213 can be configured to send an e-mail message to a SMTP server (not shown) and to send an MMS message to a MMS gateway (not shown).

Figure 4:
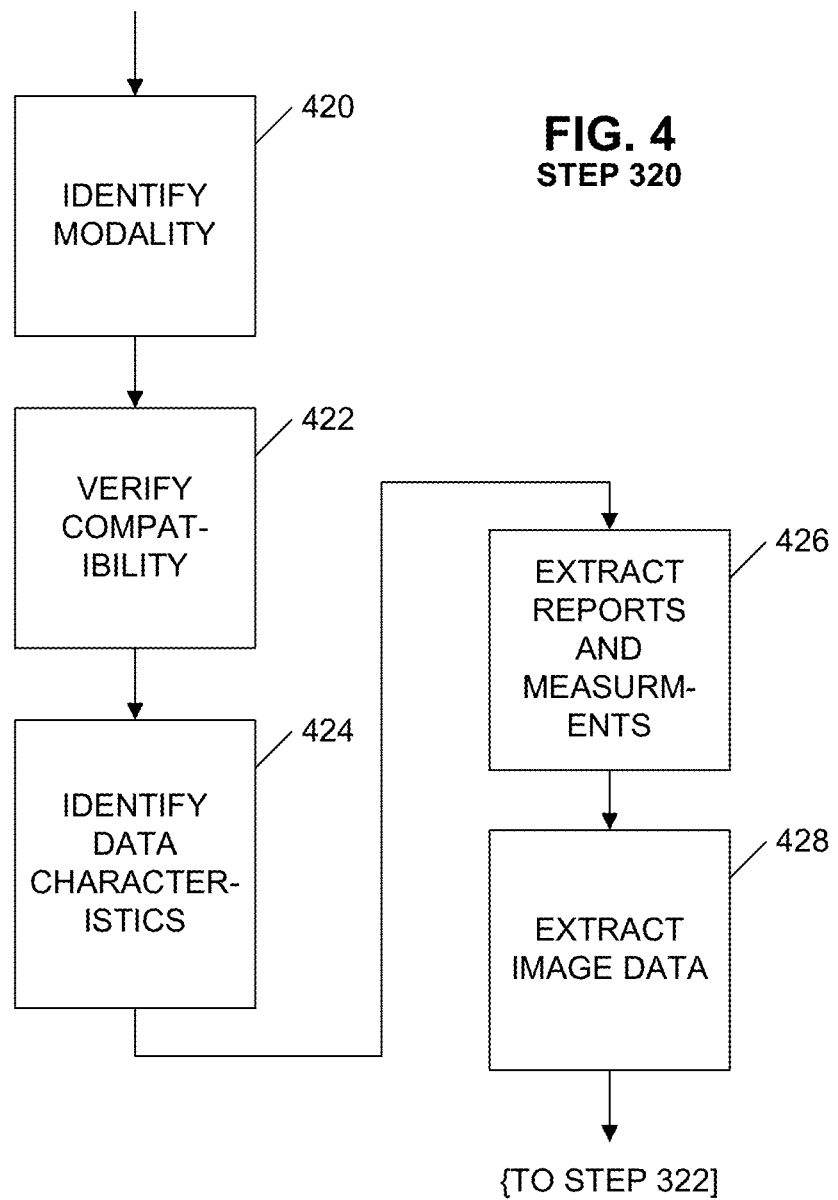
FIG. 4 is a flow chart illustrating example type of information and data that can be examined in the process of FIG. 3 in accordance with one embodiment.

FIG. 4 is a flow chart illustrating example type of information and data that can be examined in step 320. As can be seen in FIG. 4, when the file comes in, the metadata or more specifically the header can be examined to identify the input modality in step 420. In step 422, the compatibility of the modality determined in step 420 with the system can be determined. If compatible, then in step 424, specific characteristics of the data included in the image file can be determined. For example, whether or not the file actually includes any image or video data or whether the data is simply report or measurement can be determined in step 424. When an incoming file does include, e.g., report or measurement data, then such information can be extracted and stored in, e.g., a generic structured format in step 426. In step 428, any image data can then be extracted and stored as well and various characteristics can be determined such as binary encoding format, frame size, color bit depth, still image or video, etc.

Figure 5:
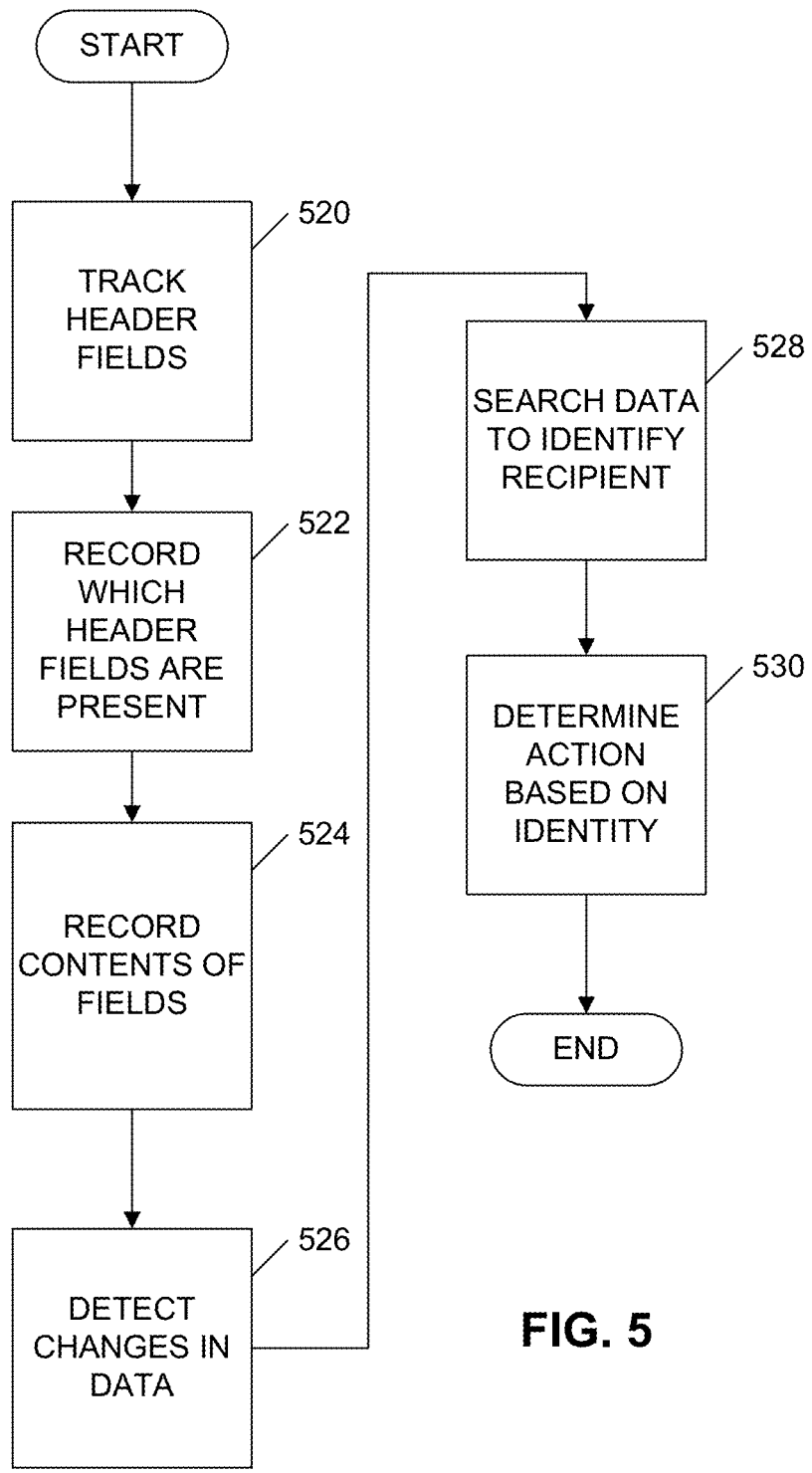
FIG. 5 is a flow chart illustrating an example process for the use of information embedded inside of the metadata included with incoming files by the data conversion and delivery system of FIG. 2 in accordance with one embodiment.

FIG. 5 is a flow chart illustrating an example process for the use of information embedded inside of the metadata including with incoming files by DCDS 32 in accordance with one embodiment. The metadata, e.g., header fields can be used to ensure safe and secure delivery of the image data included therewith. For example, a DICONDE image file can include a plurality of header fields that are key-value pairs in a number of datatypes, such as strings, numbers, dates, special measurement types, etc. Fields can be embedded in the and can be hard linked to the file for which the provide metadata. In this way, there is no way to mix-up header files and the associated data, since they are not separated.

In step 520, DCDS 32 can be configured to automatically track and record header fields for each network device sending images. In this way, DCDS 32 can identify the specific device associated with an incoming file. DCDS 32 can do this by recording which header fields are present for a particular modality 10 in step 522 and to then record the data included in device-dependent header fields for the associated modality in step 524. A particular device should always report the same values for, e.g., manufacturer, model name, model number, etc. Thus, DCDS 32 can use this information to identify a particular device.

In step 526, DCDS can detect any changes in the data and then take appropriate action. For example, changes to header field data that should not be changed, e.g., manufacturer information, can be an indication that the file has been tampered with or someone is trying to hack into the system. In response to detection of such changes, the system can log the event, notify an operator, place the incoming data in an approval queue, quarantine the data or any further data from the associated device, reject the data, rejecting the all future data from the device, to name just a few possible actions.

In step 528, DCDS can be configured to search the header fields for data that can identify an intended recipient as noted above. Identification can be in the form of an actual, e.g., e-mail address, mobile station International Subscriber Directory Number (ISDN), web site address, etc. In fact, such direct identification can be preferable as it takes advantage of the existence of the header fields. Identification can also be indirect such as an ID that can be used to look up a direct address, e.g., in a registry stored in storage system 214. It should also be noted that each field can include more than one piece of data and data of different types. Accordingly, any identifying or address fields can include telephone numbers as well as e-mail address, etc. Further, identifying data can be included in more than one field.

The DCDS 32 can be configured to then determine an action to take in step 528 based on any identifying data detected in step 530. Such actions can include sending an appropriate message to any addresses found, formatting messages appropriately as described above, notifying an operator, adding a message to a queue, e.g., for manual approval, locating and adding other data or information to an outgoing message, to name just a few.

Figure 6:
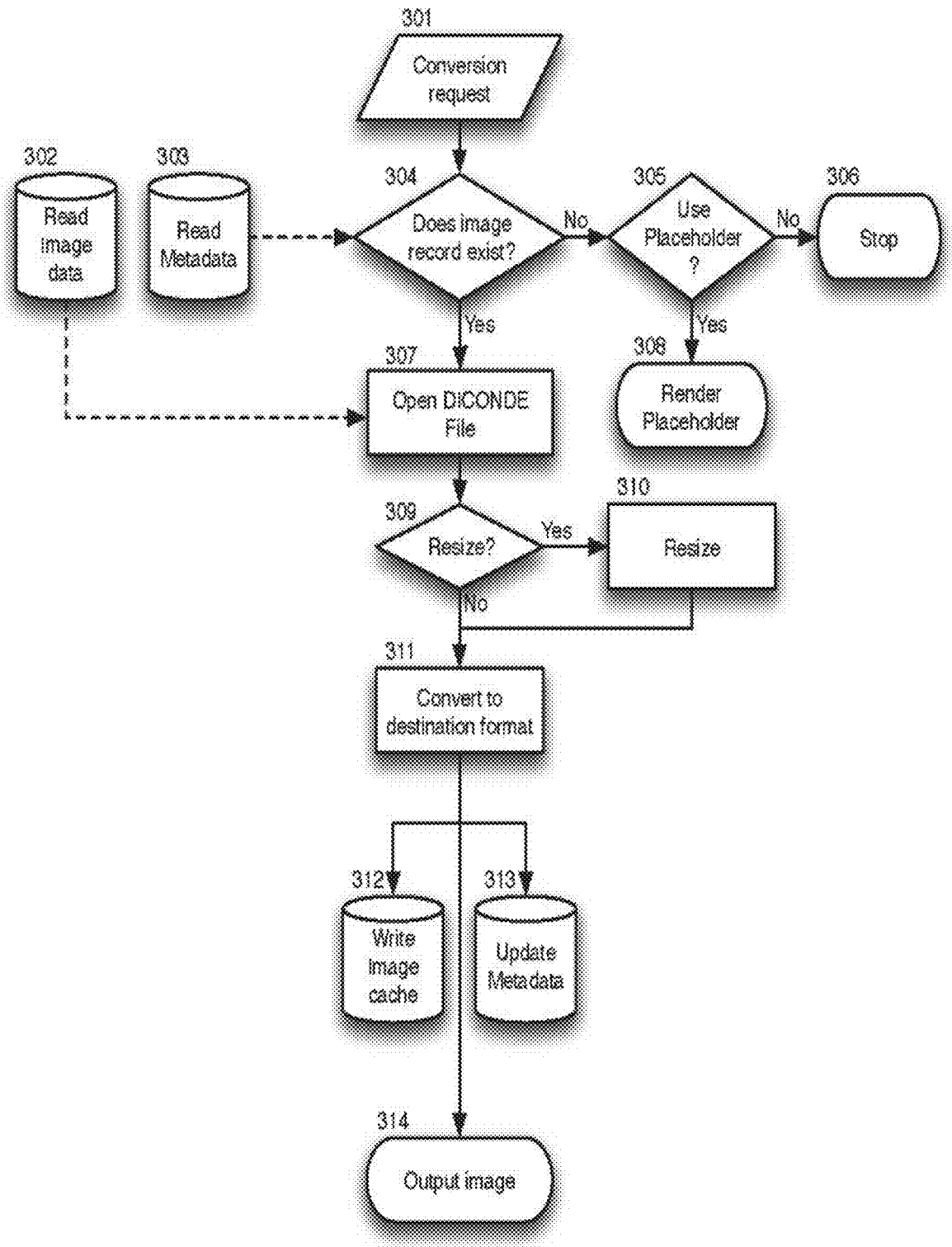
FIG. 6 is a flow chart that illustrates the operation of an image converter module that can be included in the data conversion and delivery system of FIG. 2.

Accordingly, FIG. 6 is a flow chart that illustrates the operation of DCDS 32 in more detail. Referring to FIG. 6, a Conversion Request 301 can be received containing, at a minimum, an internal identifier for the image, and a destination format. As noted above, the conversion request can be the result of information and data included in the metadata associated with an incoming file. As noted below, however, the request can also result from input received through GUI 208. Optionally, the request could contain new image dimensions to be scaled as output image to be sent. The Image Converter 211 can be configured to then determine the existence of the requested image 304 by trying to locate the metadata associated with it in metadata database 303. If no record exists for the requested image, the converter can optionally return a placeholder image (305, 308) or abort the conversion attempt 306. A placeholder is typically an image, video or similar media communicating that the requested image is unavailable. At this point, the converter also can also be configured to determine if the requested output format is feasible or not.

If a metadata record in database 303 does exist, then the converter can be configured to load the, e.g., DICONDE image 307 from image storage 302 into a raw binary format. The Converter 211 can be configured to then determine if the image data should be resized to the dimensions provided in the request or to the dimensions required by the requested output format. For example a jpeg preview for the Web GUI 208 could be rendered in any dimensions that are suitable to the layout of the html document, while video for MMS messages have very specific dimensions to comply with the specification.

Next, the image data can be converted 311 to the requested destination format. The results can be saved to an image cache 312 and metadata records can be updated 313 to indicate the existence of the converted image. Finally, the converted images can be returned as a response to the request. Converter 211 can then return either the converted binary data directly or return a reference to its location in the image cache 313.

As noted, DCDS 32 can also be operated and interfaced with through the Web GUI 208. GUI 208 can enable both remote and local access the DCDS 32 and allows for images to be located within storage system 208. The images may need to be located or analysis or diagnosis or for sending to a specified destination or address.

Two primary ways for accessing files can be provided. The first way involves finding files without any identifying information. This is explained in detail with respect to FIG. 7; however, it should first be noted that each device sending files to DCDS 32 can be identified by recording and mapping header fields of incoming file transfers. The devices can also be at least partially identified based on their network address, AE titles used for the transfer, or both. Each device can then be given a name that is unique and preferable meaningful to operators. Files as well as their series, study, or both, can then be identified by the device they originated from, the time and date of the image capture, and header fields identifying the operator of the device used to capture the images.

In one example, since no component information is needed, DCDS 32 can handle anonymized data and no component information can be gathered by the misuse of the system. Further, the most used images can be stored as the most recent images in the system. Thus, finding images can be made very efficient in this manner. Once the file, series, study, etc., had been found, GUI 208 can offer the operator direct access to features for viewing the images, sending the images, etc.

Figure 7:
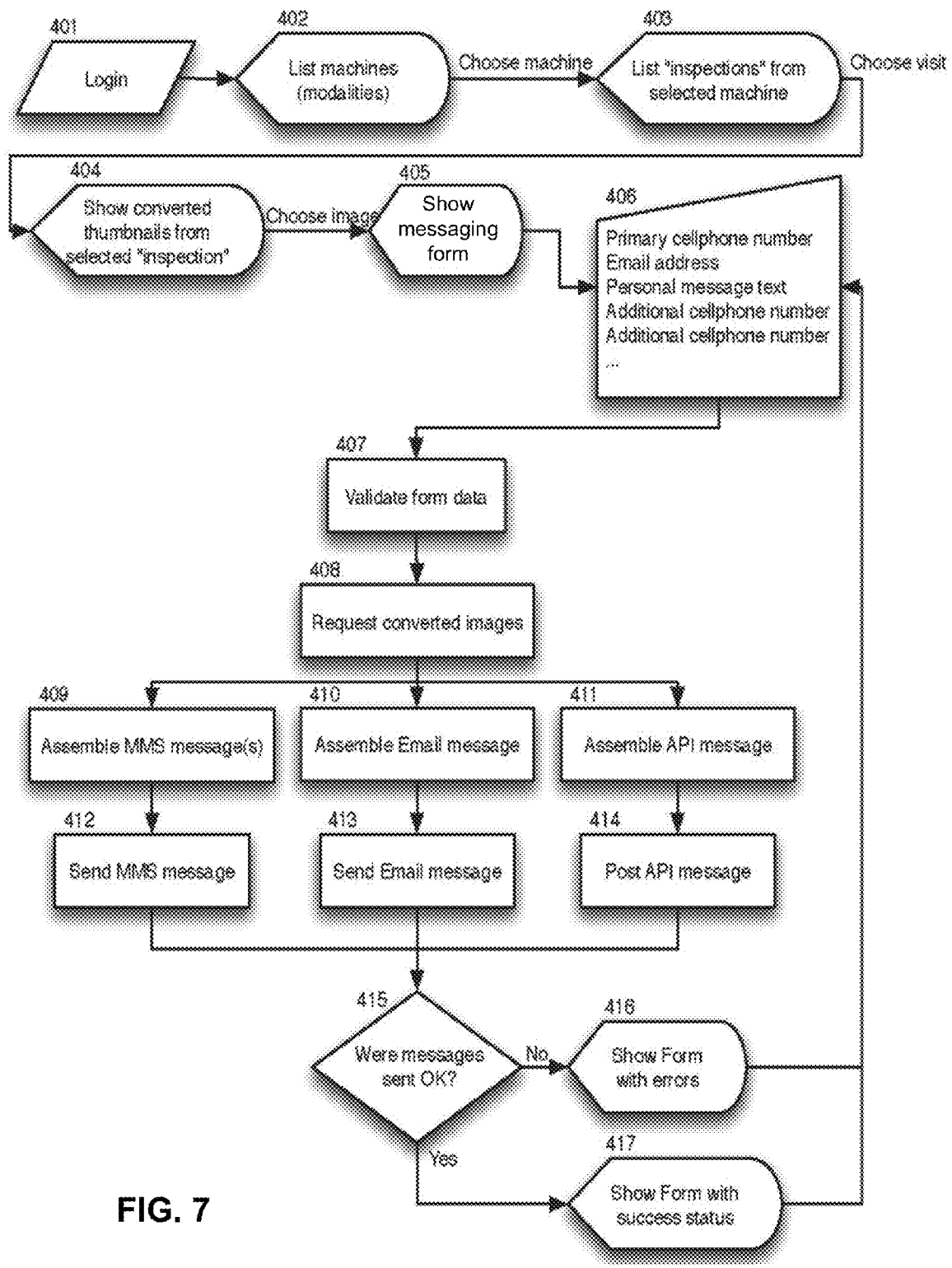
FIG. 7 is a flow chart illustrating a typical use of a Web GUI that can be included in the data conversion and delivery system of FIG. 2 and its streamlined interface for finding an image by the originating modality without any identifiable component information in accordance with one embodiment.

With this in mind, FIG. 7 is a flow chart illustrating a typical use of the Web GUI 208 and its streamlined interface for finding an image by the originating modality without any identifiable component information (401-404) in accordance with one embodiment. When an image has been identified (405) the interface displays a service request form where the user enters output destination information and other message details (406). If the data validates (407) the required conversions are requested (408) from the Image Converter (211.) For all successful requests, the data is assembled by the appropriate output plug-ins (409-411) and the results are sent (412-414) to the appropriate destinations. Status information for each individual output is gathered (415) and returned (416 or 417) to the form view (405) for display. At this point, the user can choose to repeat the send process or return to finding another image.

The Web GUI 208 allows for sending groups of images that belong to the same, e.g., DICONDE Series. The operating steps are similar to those illustrated by FIGS. 7 and 8. The Web GUI 208 also present interfaces for configuring the Event System 209, organizing and storing output destination addresses and other administrative tasks necessary.

In some embodiments, as a security measure, the Web GUI 208 does not handle any authorization of source modalities allowed to store images or access privileges to those images. These important settings are only available through a separate method of access either locally or remotely. With the DCDS running on a Unix-style operating system, remote access would typically be via the Secure Shell (SSH) protocol. If the DCDS is running on a Windows operating system, remote access would typically be via Terminal Services. Both protocols are examples of secured remote access to the operating system.

The second way to access files is to use identifying information. For example, operators can search for files using component information such as identifying name, dates, serial number, etc. The operator can, for example, input a search term and if there is a match, the system can present all available studies. If multiple components are returned, then they can be presented for selection. Once the component is selected, and the associated file, series, study, etc., had been found, GUI 208 can offer the operator direct access to features for viewing the images, sending the images, etc.

Figure 8:
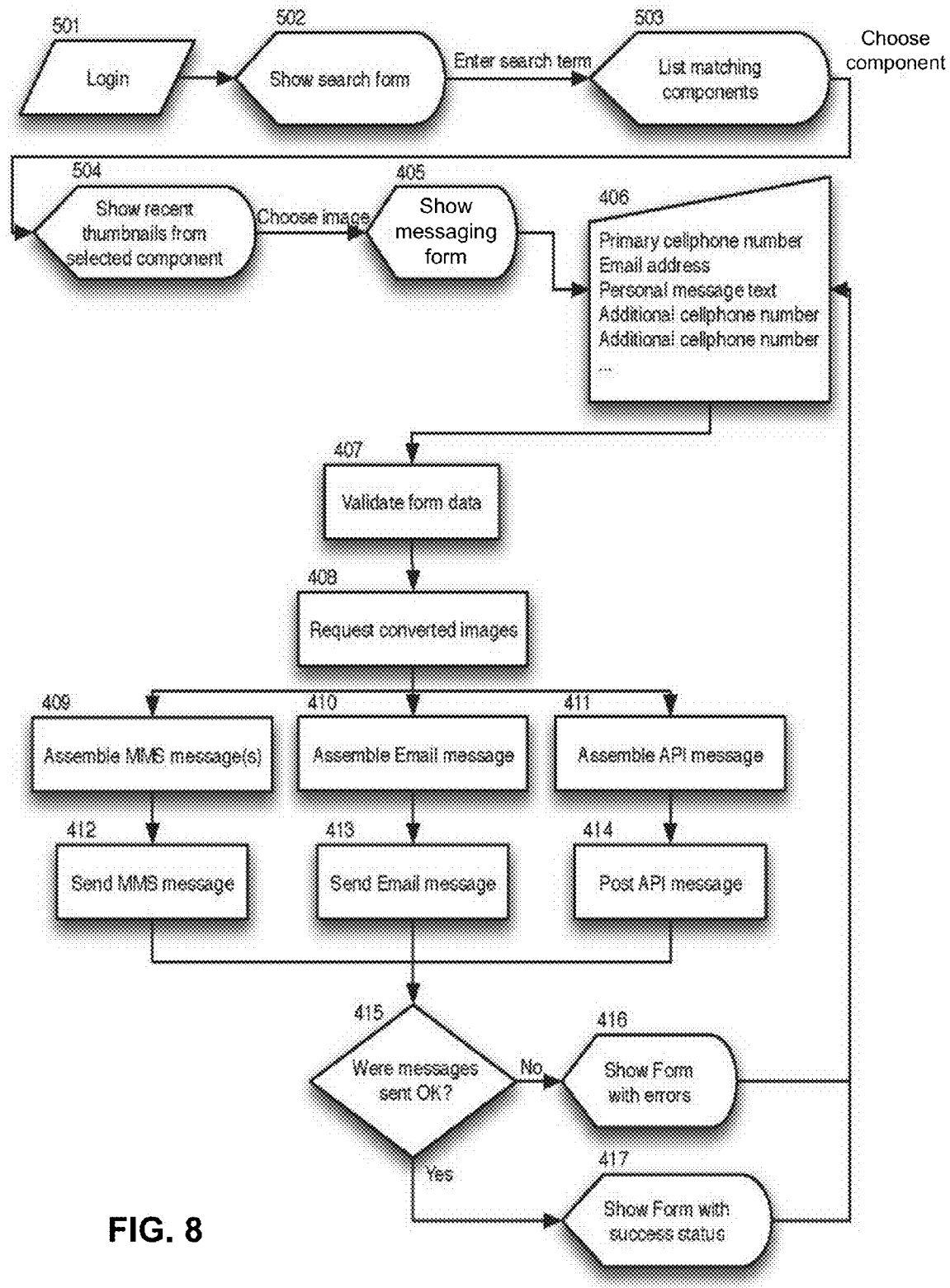
FIG. 8 is a flow chart illustrating a variation of the typical use of the Web GUI and its streamlined interface for finding an image by using a piece of identifiable component data in accordance with one embodiment.

FIG. 8 is a flow chart illustrating a variation of the typical use of the Web GUI 208 and its streamlined interface for finding an image by using a piece of identifiable component data (501-504) such as, identifying name, dates, serial number, etc. After that, the processing steps as described above related to FIG. 7 can be followed.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations.

What is claimed:

1. A method for automated conversion and delivery of nondestructive evaluation (NDE) images, comprising:
    storing a plurality of NDE images, metadata associated with the plurality of NDE images, converted NDE images, a plurality of standardized format specifications for a plurality of destination devices and services, and a plurality of message templates;
    receiving a NDE image file via a communications interface, the NDE image file comprising NDE data and metadata, the NDE data having a NDE data format;
    determining whether the NDE data includes NDE image data;
    obtaining an output destination type from the NDE image file metadata received via the communications interface, wherein the output destination type is associated with at least one destination identified in the NDE image file metadata where the NDE image data is to be transmitted;
    correlating the output destination type with one or more of the plurality of standardized format specifications and with one or more of the plurality of message templates;
    converting the NDE data format associated with the NDE data based on the standardized format specifications that correlate with the output destination type; and
    assembling at least one output message that includes the converted NDE data based on the message templates that correlate with the output destination type; and
    transmitting the output message to the at least one destination via the communication interface.

2. The method of claim 1, wherein the communication interface comprises a plurality of output gateways, and wherein the method further comprises correlating the destination type with at least one output gateway and transmitting the output message or messages via the appropriate gateway or gateways.

3. The method of claim 2, wherein the output destination type is a device.

4. The method of claim 2, wherein the output destination type is a service an email account.

5. The method of claim 2, wherein the output destination type is a web site that comprises an Application Specific Interface (API) for communicating with the website, and wherein the associated standardized format specification and message template is compatible with the API.

6. The method of claim 1, wherein at least some of the metadata is included in a header portion of the NDE image file received via the communications interface from an image source modality.

7. The method of claim 1, further comprising storing the converted NDE data at least temporarily.

8. The method of claim 1, further comprising storing the NDE image file.

9. The method of claim 8, wherein storing the NDE image file comprises storing the NDE image content and at least some of the metadata.

10. The method of claim 1, further comprising identifying a modality associated with the NDE data based on the metadata.

11. The method of claim 1, further comprising identifying specific characteristics of the NDE data and extracting the NDE data.

12. The method of claim 11, wherein identifying specific characteristics of the NDE data comprises determining whether the NDE data includes reports, measurements, or both, and wherein the method further comprises extracting the NDE data, converting it into a generic structured format, and storing the NDE data in the generic structured format when it is determined that the NDE data includes reports, measurements, or both.

13. The method of claim 11, wherein identifying specific characteristics of the NDE data comprises identifying at least one of the binary encoding format, frame size, color bit depth, and whether the NDE data includes still images or video images, when it is determined that the NDE data includes NDE image data.

14. The method of claim 1, further comprising storing destination specific information for a plurality of destination devices or services, and wherein the method further comprises correlating the output destination type with at least some destination specific information and converting the NDE data format associated with the NDE data and assembling at least one output message that includes the converted NDE data based on the destination specific information.

15. The method of claim 14, wherein the destination specific information includes capabilities of the destination device or service, physical characteristics of the destination device or service, limitations associated with a network class associated with the destination device or service, limitations associated with a message type associated with the destination device or service.

16. The method of claim 15, wherein the destination specific information includes at least one of a frame size, data rate, data size, and supported encoding format.

17. The method of claim 1, wherein the NDE data is not converted when the standardized format specification indicates that the destination type is compatible with the NDE data format.

18. The method of claim 1, wherein the output message includes the NDE data and additional data.

19. The method of claim 18, wherein the additional data is manually entered via a user interface coupled with the server, extracted from the metadata, or both.

20. The method of claim 1, further comprising storing instructions for the anonymization of the NDE data, and wherein the method further comprises modifying the NDE data based on the anonymization instructions when required before assembling the output message.

21. The method of claim 1, wherein the NDE data format complies with the digital imaging and communication in nondestructive evaluation standard.

22. A system for automated conversion and delivery of nondestructive evaluation (NDE) images, comprising:
    a communication interface;
    a data storage system configured to store a plurality of NDE images, metadata associated with the plurality of NDE images, converted NDE images, a plurality of standardized format specifications for a plurality of destination devices and services, and a plurality of message templates;

a receiver configured to receive a NDE image file via the communications interface, the NDE image file comprising NDE data and metadata, the NDE data having a NDE data format that complies with the digital imaging and communication in nondestructive evaluation standard, a parser configured to determine whether the NDE data includes a NDE image data and to determine obtain an output destination type from the NDE image file metadata received via the communication interface, wherein the output destination type is associated with at least one destination identified in the NDE image file metadata where the NDE image data is to be transmitted;

a correlator configured to correlate the output destination type with one or more of the plurality of standardized format specifications and with one or more of the plurality of message templates, an image converter configured to convert the NDE data format associated with the NDE data based on the standardized format specifications that correlate with the output destination type, and assembler configured to assemble at least one output message that includes the converted NDE data based on the message templates that correlate with the output destination type, and an output module configured to transmit the output message to the at least one destination via the communication interface.

23. The system of claim 22, wherein the communication interface comprises a plurality of output gateways, and wherein the output module is further configured to correlate the destination type with at least one output gateway and to transmit the output message or messages via the appropriate gateway or gateways.

24. The system of claim 23, wherein the output destination type is a device.

25. The system of claim 23, wherein the output destination type is a service.

26. The system of claim 23, wherein the output destination type is a web site that comprises an Application Specific Interface (API) for communicating with the website, and wherein the associated standardized format specification and message template is compatible with the API.

27. The system of claim 22, wherein the image converter is further configured to store the converted NDE data at least temporarily.

28. The system of claim 22, wherein the storage system is configured to store the NDE image file.

29. The system of claim 28, wherein storing the NDE image file comprises storing the NDE image content and at least some of the metadata.

30. The system of claim 22, wherein the parser is further configured to identify a modality associated with the NDE data based on the metadata.

31. The server of claim 22, wherein the parser is further configured to identify specific characteristics of the NDE data and extracting the NDE data.

32. The system of claim 31, wherein identifying specific characteristics of the NDE data comprises determining whether the NDE data includes reports, measurements, or both, and wherein the server is further configured to extract the NDE data, convert it into a generic structured format, and store the NDE data in the generic structured format when it is determined that the NDE data includes reports, measurements, or both.

33. The system of claim 31, wherein identifying specific characteristics of the NDE data comprises identifying at least one of the binary encoding format, frame size, color bit depth, and whether the NDE data includes still images or video images, when it is determined that the NDE data includes NDE image data.

34. The system of claim 22, wherein the storage system is further configured to store destination specific information for a plurality of destination devices or services, and wherein the server is further configured to correlate the output destination type with at least some destination specific information and to convert the NDE data format associated with the NDE data and assemble at least one output message that includes the converted NDE data based on the destination specific information.

35. The system of claim 34, wherein the destination specific information includes capabilities of the destination device or service, physical characteristics of the destination device or service, limitations associated with a network class associated with the destination device or service, limitations associated with a message type associated with the destination device or service.

36. The system of claim 34, wherein the destination specific information includes at least one of a frame size, data rate, data size, and supported encoding format.

37. The system of claim 31, wherein the NDE data is not converted when the standardized format specification indicates that the destination type is compatible with the NDE data format.

38. The system of claim 31, wherein the output message includes the NDE data and additional data.

39. The system of claim 38, wherein the additional data is manually entered via a user interface coupled with the server, extracted from the metadata, or both.

40. The system of claim 31, wherein the storage system is further configured to store instructions for the anonymization of the NDE data, and wherein the server is further configured to modify the NDE data based on the anonymization instructions when required before assembling the output message.

* * * * *